Figure 1:
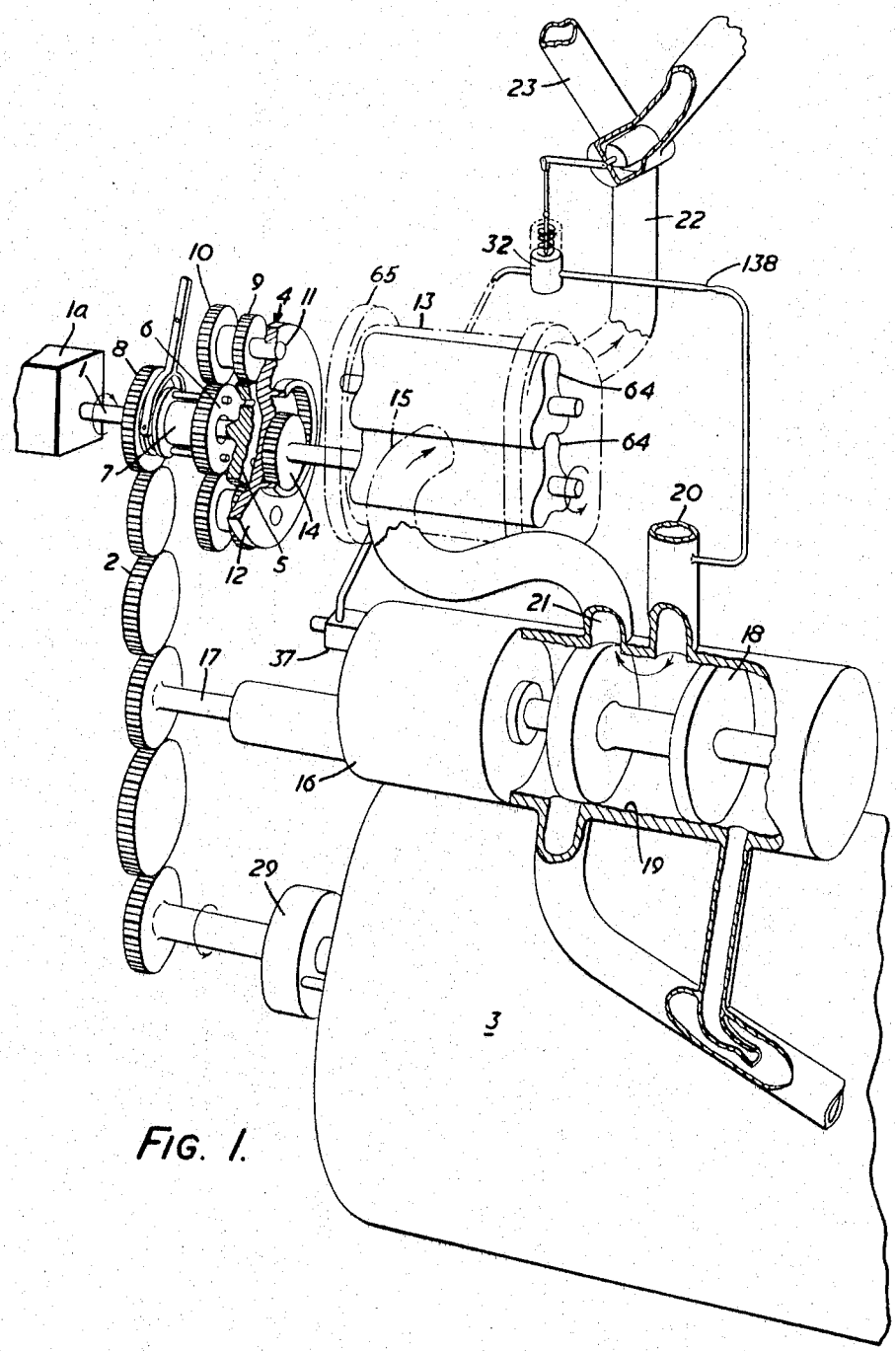

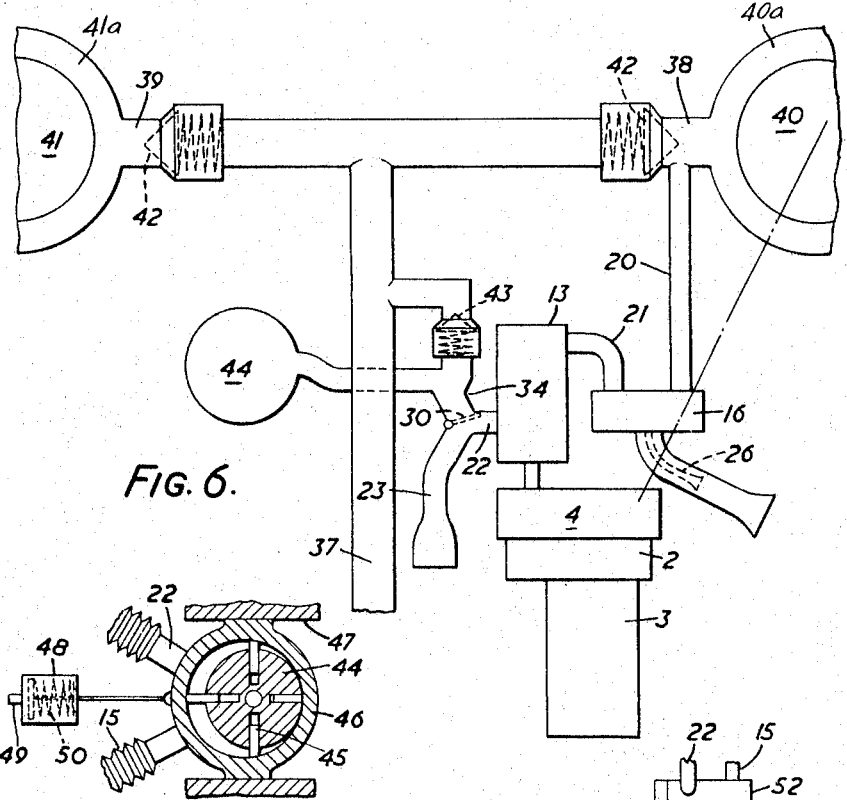
FIG. 6.
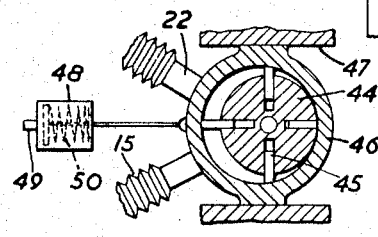
FIG. 7.
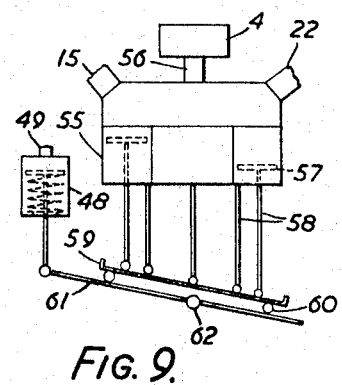
FIG. 9.
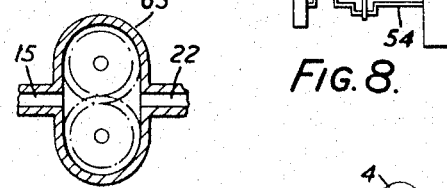
FIG. 8.
FIG. 10.
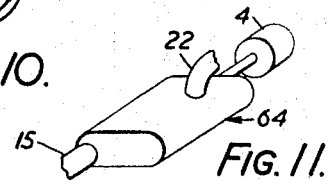
FIG. 11.

United States Patent Office 3,298,250
Patented Jan. 17, 1967

---

3,298,250
COMPOSITE MECHANICAL DRIVES
Norman Moss, London, and Peter Stanwell, Wanstead, England, assignors to Plessey U.K. Limited, a British company
Filed June 24, 1960, Ser. No. 38,671
Claims priority, application Great Britain, July 10, 1959, 23,756/59; Nov. 11, 1959, 38,324/59; Feb. 18, 1960, 5,762/60
23 Claims. (Cl. 74—675)

This invention relates to constant-speed drives. Constant-speed drives are known which permit the drive of an electric alternator or other element required to be driven at a substantially constant speed to be mainly derived from the output of an engine, for example of an aircraft engine, which is subject to speed variations within a predetermined range, the speed of the element being kept substantially constant with the help of an auxiliary motor which is adapted to be power-driven to supplement the engine-derived speed of the alternator or the like when the engine speed is low and to rotate in the opposite direction and thus reduce the speed of the alternator or the like below the engine-derived speed when the engine speed is high. It is an object of the present invention to provide an improved constant-speed drive of the kind specified, in which the said auxiliary motor can also be utilised to start the engine.

Another object is to provide an improved combined constant-speed drive and engine-starter device for internal combustion engines operable at variable speed, wherein the power for the constant speed drive is derived from the engine power at a high efficiency.

One aspect of the present invention consists in a constant-speed drive wherein an element to be rotated at a constant speed is coupled by a differential gear to an engine subject to speed variations and to an auxiliary motor adapted to be power-driven in one direction at an automatically variable speed to supplement the speed of the element derived from the engine, and to be driven by the reaction of the differential gear in the opposite direction against an automatically variable resistance to compensate for the effect of excess engine speed on the speed of the element, selectively operable means being provided for so altering the operation of the differential gear as to permit utilisation of the auxiliary motor to start the engine.

From another aspect the constant speed drive comprises a differential gear interposed between an engine subject to speed variations and an element to be driven at constant speed, the differential gear being also connected to an auxiliary motor, and automatic means controlling said motor according to engine speed to be power-driven in one direction to supplement the speed of the element when the engine speed is low and to be driven in the reverse direction to reduce the speed of said element when the engine speed is high, and automatic undirectional locking means permitting the driven element to rotate in one direction only, means being provided for power-driving the auxiliary motor in the said reverse direction to start the engine. In order to enable this to be done without any gear change, the transmission ratios on the drive are so chosen that the air motor when running at full speed will drive the engine at a speed exceeding the usual starter decoupling speed, which generally is about one quarter to one third of the normal engine running speed, while on the other hand the transmission ratios to the alternator are such that the full range of the air motor operation from full forward speed to full reverse speed is sufficient to compensate for engine speed variations throughout the range between idling speed (which generally is about one half of the maximum engine running speed) and the full maximum speed of the engine. The reversal of the direction of the air motor for engine-starting purposes is controlled by a starter-valve arrangement which admits air under pressure to the "outlet" side of the motor while the "inlet" side is cut off from air supply and replaced by the exhaust connection. The operation of the starter valve may be mechanically or otherwise interconnected with the means for locking the alternator, but preferably the locking of the alternator is automatically effected by a freewheel-type unidirectional locking device (one-way brake) which freely allows rotation of the alternator in the normal direction but prevents reverse rotation.

According to a feature of the invention control of the flow through the motor is effected by a slide valve which in normal operation is controlled by a governor responsive to the speed of the alternator or the like, and if desired the slide valve may, according to a further feature of the invention, be arranged to control the flow at both sides of the motor, means being provided for moving the slide valve beyond its position corresponding to minimum normal engine speed in order to reverse the motor connections for starting purposes.

From a third aspect the invention provides a constant-speed drive wherein an element to be driven at a constant speed is coupled by a differential gear to an engine subject to speed variations and to a positive-displacement fluid-pressure motor, automatic control means being provided operative at low engine speeds to power-drive the fluid pressure motor in one direction at such speed as to supplement the speed of the element derived from the engine to a predetermined constant speed operative at higher engine speeds to allow the fluid pressure motor to be driven by reaction from the gear and so controlling the speed of said motor by regulating the flow of fluid derived from said motor acting as a pump, as to reduce the speed of the element below the speed derived from the engine to the said predetermined constant speed, means being provided for selectively altering the operation of the differential gear as to permit utilisation of the fluid pressure motor to start the engine.

A fourth aspect consists in a constant speed drive wherein an engine and a rotary positive-displacement machine are through a differential gear coupled to an element to be driven at a constant speed, means being provided for supplying the rotary displacement machine with fluid to power-drive it in one direction under speed-responsive control to keep the speed of the element substantially constant irrespective of variations in engine speed, and for alternatively supplying said machine with fluid in the opposite direction to power-drive it in said opposite direction, automatic locking means being further provided which permit the said element to be driven in only one direction so as to cause the engine to be driven in the normal direction when the machine is thus driven in the reverse direction.

According to a further feature of the invention provision may also be made for utilising the air motor to drive both the engine shaft and the alternator, both in their normal directions. This is useful for test runs on the ground when the main engine is switched off, or after disconnection of the main engine itself, to drive some of its auxiliary gear together with the alternator. According to this feature of the invention means may be provided by which the differential gear can be locked while air is supplied to drive the air motor in the "reverse" direction similarly as during engine starting (assuming that the differential is so arranged that in the unlocked condition and with the air motor stationary the speed of the element driving the alternator is greater than the speed of the engine-driven element). In this case both the engine and alternator will be driven each in its normal running direction at a predetermined speed ratio independent of their respective mechanical resistance.

When the engine is at a standstill and throughout a starting operation, the governor-controlled valve which normally regulates the air motor, will be in a position connecting the normal inlet aperture of the air motor with the bleed-air outlet of the main turbo engine, and since under these circumstances the main engine is stationary, or runs very slowly, there is no pressure at its bleed air outlet, so that the motor "inlet" can in these circumstances be assumed to be open to atmosphere. The "outlet" of the motor would normally be open to atmosphere under these conditions, but according to a feature of the present invention, the exhaust connection is provided with a valve which is closed, under the control of the pressure sensitive element, as long as the engine speed is lower than idling speed, this valve being preferably controlled by the bleed-air pressure of the main engine. Air pressure from any suitable source can then be admitted to the "outlet" of the motor, at a point between the motor and the said vent controlled by engine bleed air pressure, to drive the motor in the direction opposite to that serving for normally driving the alternator, the exhaust from the motor passing through the control valve to the engine compressor. If desired or found necessary, the duct from the motor through the control valve to the engine may be provided with an auxiliary dump port which is open when the speed of the engine is within a range extending from zero to at least the de-coupling speed of the starter.

In order to provide an extra safeguard against the alternator being driven at excessive speed if the control valve should get stuck in the position for low engine speed when in fact the engine runs at high speed, it is desirable to provide an emergency cut-out which at a predetermined maximum speed of the alternator prevents the air motor from being driven in the direction increasing the speed of the alternator. According to a feature of the invention the exhaust-connection valve mentioned above may be utilised for this purpose, either by interposing a trip arrangement which causes this valve to be moved to a third position in which the normal exhaust line is cut off altogether or, if the line from the starting power supply is suitably protected by non-return valves, by utilising the same position of this valve to which it is moved during the starting. This may conveniently be achieved by a governor-controlled valve which opens the pressure chamber of the pressure-sensitive element to atmosphere, a suitable restriction being interposed in the line between the said pressure chamber and the bleed-air line.

An economy in the fluid consumption under varying supply-pressure conditions can be achieved if the fluid displacement motor is of the variable displacement type, means being provided for automatically adjusting the displacement of said motor according to the supply pressure available when the motor is power-driven by fluid pressure.

A combined constant-speed drive-and-starter unit incorporating the invention is illustrated in the drawings accompanying the specification.

FIGURES 1 to 5 are somewhat diagrammatical perspective views illustrating one form of apparatus according to the invention.

Figure 2:
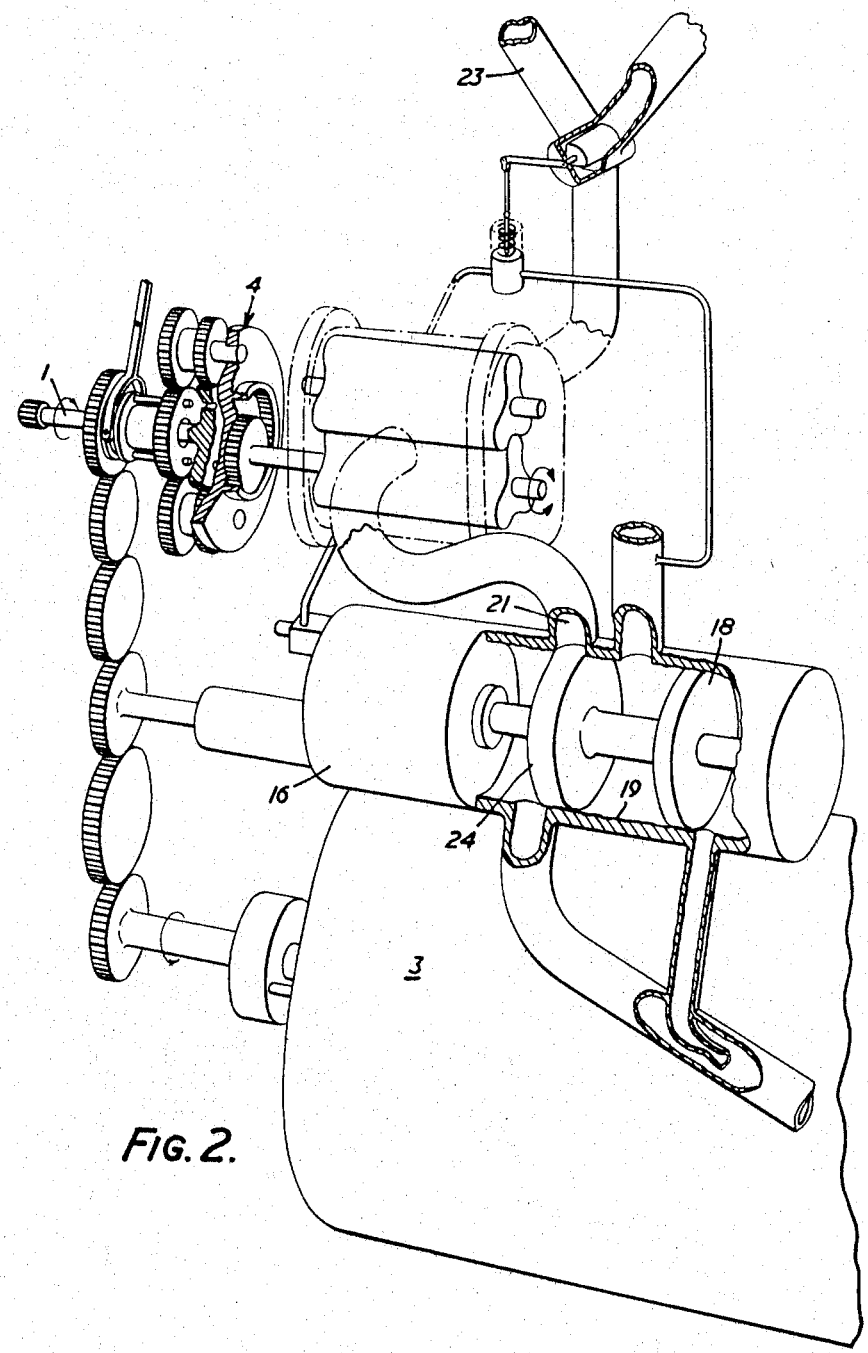
Figure 3:
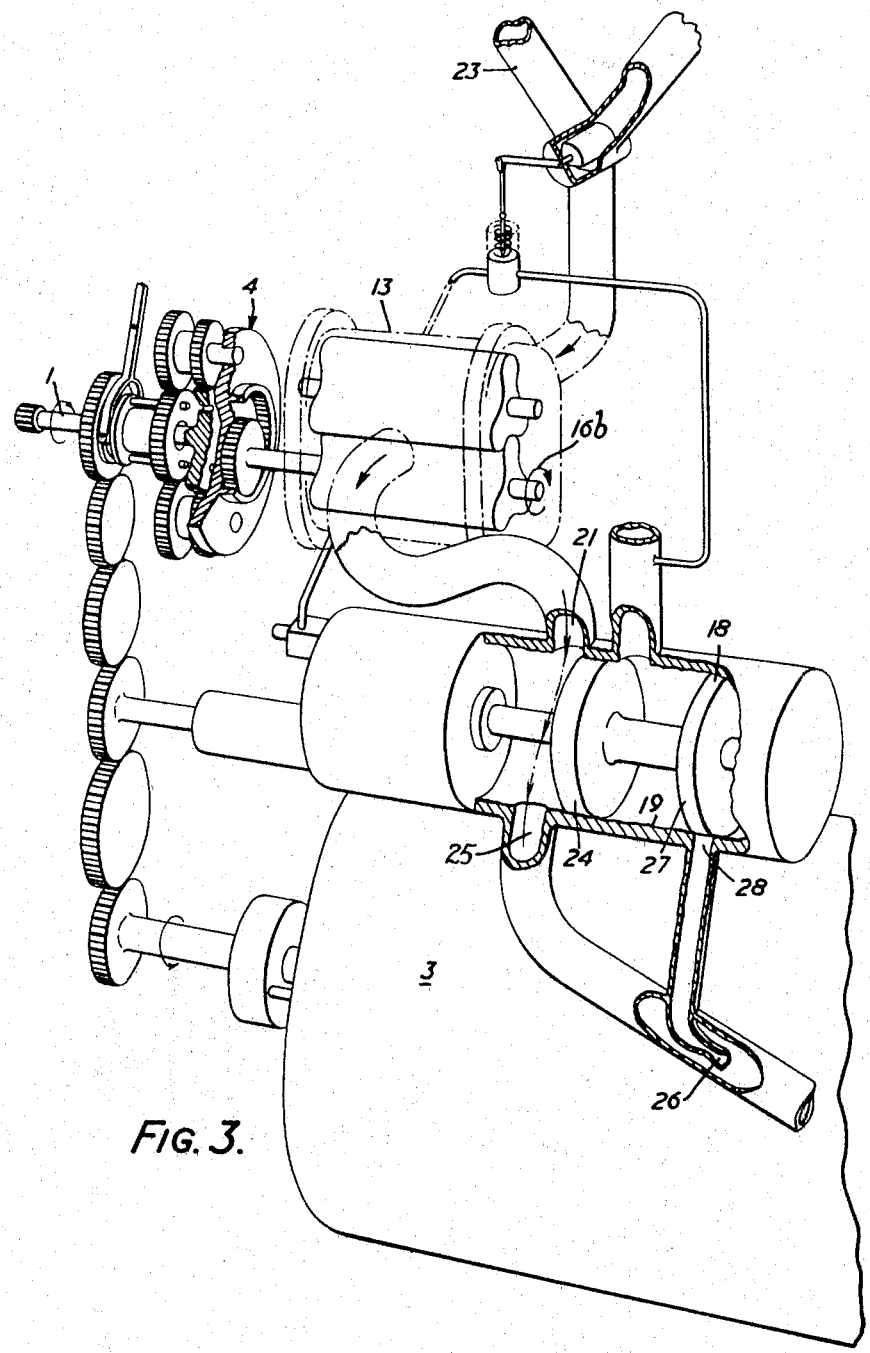
Figure 4:
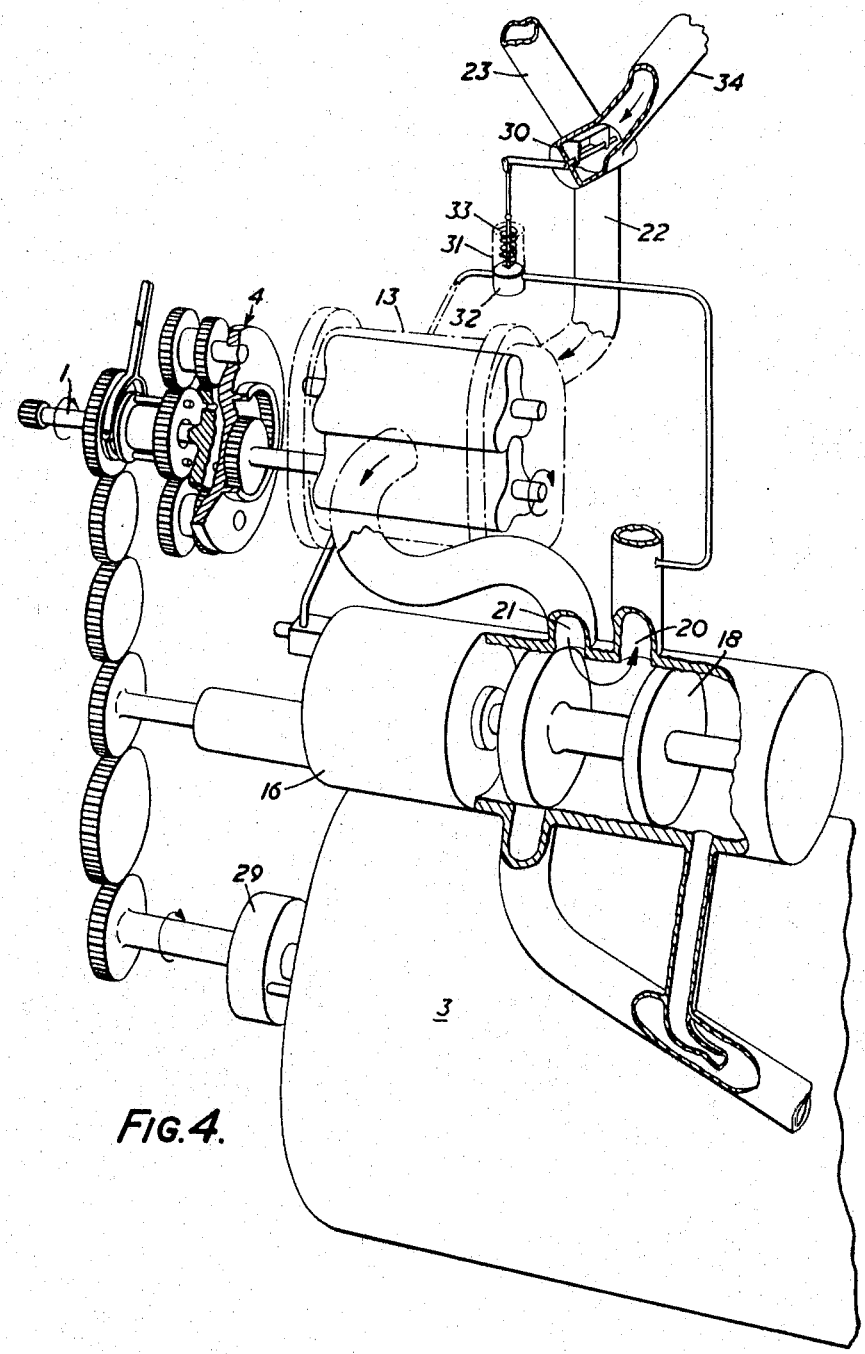

FIGURE 1 shows the apparatus at low engine speed,
FIGURE 2 at normal engine speed corresponding to the normal alternating speed when the air motor is stationary, and
FIGURE 3 at high engine speed;
FIGURE 4 shows the apparatus when used for starting, and
FIGURE 5 similarly shows the apparatus when used for driving the engine shaft and alternator for trial runs and the like when the engine is inoperative or disconnected;

FIGURE 6 is a flow diagram illustrating the combination of the apparatus with two engines in a plant adapted to supply bleed air individually or separately, and FIGURES 7 to 11 respectively illustrate five different types of fluid-pressure machine which may be used instead of the Roots-type air motor 13 shown in FIGURES 1 to 5.

Referring now first to FIGURES 1 to 5, a drive shaft 1 normally coupled to an engine 1a is connected through a gear train 2 to the shaft of an alternator 3 which is required to be driven at a constant speed substantially independent of variations of engine speed within the range from idling speed to maximum running speed of the engine. In order to permit compensation of the engine-speed variations, the shaft 1 is coupled to the gear train 2 through a differential gear 4 of which the larger sun wheel 5 is mounted on the shaft 1, while the smaller sun wheel 6 is rigidly connected by a shaft 7 with a gear 8 of the gear train 2. The sun wheels 5 and 6 respectively mesh with interconnected planet wheels 9 and 10 of which the shafts 11 are mounted in a planet carrier 12, and a Roots-type air motor 13 having lobed rotors 64 and phasing gears 65 is coupled to the planet carrier through reducing gearing 14. It will be evident to those skilled in the art that as a result the speed at which the alternator 3 is driven by the differential gear 4 is proportional to the algebraic sum of the respective speeds of the engine and air motor each subject to a proportionality factor introduced by gearing. Thus when the engine runs below its normal speed, the deficiency in alternator speed can be made by admitting air to drive the air motor in the direction, indicated by arrows 15, 15a which will increase the speed of the shaft 7, while when the engine runs above normal speed, the excess of speed can be taken up and the alternator speed thus reduced to normal by allowing the air motor to be driven by the differential gear in the opposite direction indicated by arrows 15b, so as to work as a pump, as illustrated in FIGURE 3, its speed being controlled by suitably throttling the outlet when the excess of engine speed is only moderate. This control is effected by a governor unit 16 having a governor shaft 17 which is driven by the gear train 2 and therefore rotates at a speed proportional to that of the shaft of the alternator 3. The governor unit 16 is arranged to move a slide-valve spool 18 in a cylindrical slide-valve seat 19 to a position corresponding to the momentary speed of the alternator. The governor unit itself may be constructed substantially as shown in co-pending patent application Serial No. 67,826 by Norman Moss, filed November 7, 1960, now Patent No. 3,080,774. Air under pressure for driving the air motor, for example engine compressor bleed air, is admitted to the stationary part, hereinafter called the valve seat of the governor through a port and connection 20 and when the spool 18 is in the position corresponding to low engine speed, is further admitted through slide-valve port and connection 21 to the air motor 13, while the exhaust from the air motor passes through a line 22 to a vent outlet 23.

As shown in FIGURE 1, such variations of the alternator speed as are likely to occur normally, will cause the spool 18 to uncover only part of the port 21, thus throttling the admission of air to the motor 13 and thereby regulating the speed of the latter according to the amount of discrepancy of the momentary alternator speed from the normal alternator speed.

When the engine speed is normal, and therefore no contribution from the air motor is required to the speed of the alternator, the spool 18 will assume the position illustrated in FIGURE 2, in which port 21 is entirely cut off by the land 24 of the valve spool, thereby isolating the air motor, which thus is held substantially stationary.

When engine speed is higher than normal, so that with the air motor stationary the alternator would rotate at an excessive speed, the spool 18 moves beyond the neutral position shown in FIGURE 2 towards the position shown in FIGURE 3, thereby progressively opening a connection between port 21 and a vent port 25. This permits the air motor 13 to be driven by reaction forces of the differential gear 4 in the direction opposite to that in which it is driven by air under pressure when valve spool 18 is in the position of FIGURE 1. When thus driven, the air motor 13 draws air from vent 23 and exhausts it through ports 21 and 25 against a resistance produced by the throttle action of land 24 in these ports. This throttle action progressively decreases as, with increasing alternator speed, or increasing time at which the alternator speed is above normal, the spool 18 is moved further in the excess-speed direction. When the spool is in the position shown in FIGURE 3, ports 21 and 25 are entirely clear of the line 24, thus opposing only a minimum resistance to the run of the air motor 13

In order to extend the speed range available, means are provided which when the spool is moved still further in the excess-speed direction, cause suction to be produced at port 25. These means comprise an ejector arrangement 26, the admission of air under pressure from connection 20 to the ejector 26 being controlled by an additional land 27 of the spool 18, which in this case partly or wholly uncovers an ejector port 28 in the valve seat 19.

FIGURE 4 illustrates the same unit when used for starting the engine. As will be evident to those skilled in the art, it will be necessary, in order to transmit torque from the air motor to the engine, to prevent the alternator from rotating freely, and it will moreover be evident that in these circumstances operation of the air motor to the direction in which it is operated at low engine speed to increase the speed of the alternator would turn the engine in the reverse direction, and that therefore it is also necessary to reverse the direction of the air motor. This last-mentioned fact is utilised for automatically preventing the alternator from rotation when the motor is used for starting purposes, for this purpose a unidirectional locking device 29 also known as sprag brake is included in the alternator drive. It is arranged to permit free rotation of the alternator in the direction in which it is normally driven by the engine but to prevent rotation of the alternator in the opposite direction. Accordingly when the air motor is driven in the "reverse" direction for starting purposes with the engine at a standstill, the torque transmitted from the air motor to the alternator shaft cannot produce rotation of the alternator in the reverse direction, and the total output of the air motor is therefore conducted to the engine drive shaft 1, driving the same in the normal running direction of the engine.

Under starting conditions, the engine speed is so low that the valve spool 18 is in the low-speed position shown in FIGURE 4, in which ports 20 and 21 freely communicate with each other, but since the engine is stationary, its compressor does not produce any bleed-air pressure, so that port 20 can be considered as an exhaust port. In order to drive the motor 13 in the requisite direction, it is therefore only necessary to admit air to the motor through port 22 while cutting off the vent connection 23. The latter operation is effected by valve 30 which is automatically actuated under these conditions by an actuator 31 including a pressure-sensitive expansible chamber 32 which communicates with port 20. When the engine is running at or above idling speed, the pressure of the bleed air in port 20 will act in chamber 32 to move the valve 30 to the position shown in FIGURES 1 to 3, while under starting conditions, i.e. in the absence of such pressure, a spring 33 moves the valve 30 to the position shown in FIGURE 4, in which it closes the vent 23 and opens the pressure-supply line 34 through which air under pressure for starting purposes can be admitted under the control of, for example, a starter button, not shown, from any suitable supply.

Figure 5:
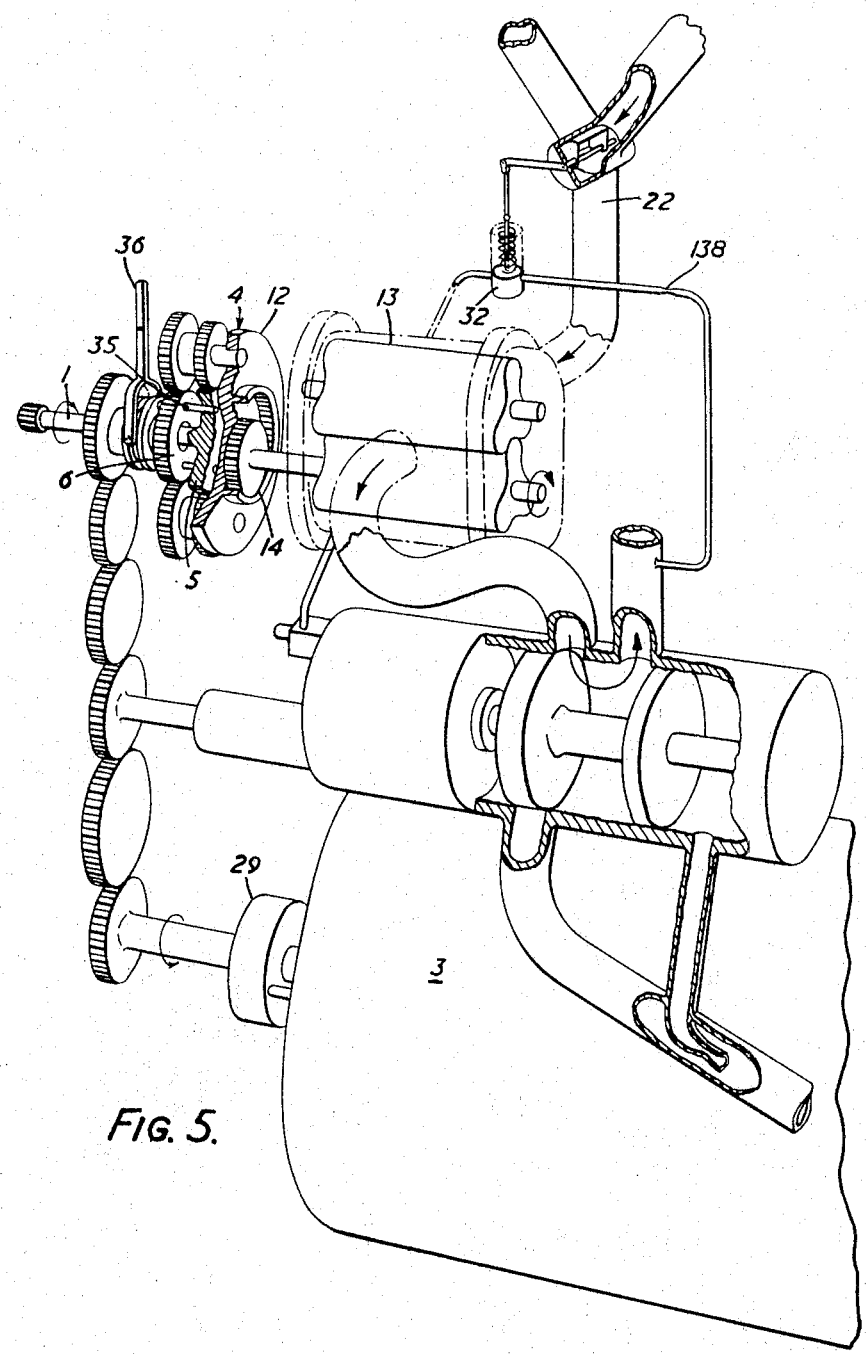

FIGURE 5 illustrates features which permit the air motor also to be used for driving both the engine drive shaft 1 and the alternator 3 in their normal directions when engine power is not available, for example for testing purposes or in the case of engine failure. In this case, the differential gear is rendered inoperative by a locking device including locking pins 35 which when engaged into the sun wheel 5 by operation of a forked lever 36, cause both sun wheels 5 and 6 to rotate bodily with the planet carrier 12 at a speed determined by the speed of the motor 13 as reduced by the gearing 14. Apart from this, the operation of the air motor is similar to that described with reference to FIGURE 4.

In order to avoid the need of a gear change when changing from engine-starting operation to constant speed operation, the transmission ratios in the drive are so chosen that the air motor when running at full speed will drive the engine at a speed exceeding the usual starter de-coupling speed, which generally is about one quarter to one third of the normal engine running speed, while on the other hand the transmission ratios to the alternator are such that the full range of the air motor operation from full forward speed to full reverse speed is sufficient to compensate for engine speed variations throughout the range between idling speed (which generally is about one half of the maximum engine running speed) and the full maximum speed of the engine.

The invention further provides means for preventing operation of the air motor when the alternator speed increases beyond a predetermined limit, for example if, with the engine working at full speed, the spool 18 for some reason has gotten stuck in the position illustrated in FIGURE 1. In this case an emergency valve 37 is opened by the governor unit 16 to vent pressure chamber 32 of the value actuator, a metering restriction 38 in the connection between this chamber and the port 20 ensuring that the pressure in chamber 32 drops sufficiently for the valve to assume its "starting" position illustrated in FIGURES 4 and 5 irrespective of the air pressure in port 20. When in this position, the valve 30 blocks the outlet from line 22 and therefore prevents the air motor from operating.

FIGURE 6 shows diagrammatically the arrangement of a power plant having two main engines to one of which the alternator 3 is coupled by the differential gear 4, and in which provision is made for enabling the alternator to be driven by bleed air from the other engine with the connections as illustrated in FIGURE 5 when the engine normally driving the alternator is inoperative and has been uncoupled from the engine drive shaft 1, while at the same time ensuring that a further consumer point for engine compressor bleed for example a cabin pressurising system normally supplied with bleed air from both turbines is automatically isolated from any engine which may be stationary. For this purpose the line 37 leading to the further consumer is connected to the bleed-air outlet lines 38 and 39 respectively of the engine compressor 40a of the engine 40 with which the alternator is normally associated and of the other engine and engine compressor 41, 41a with the interposition in each case of a non-return valve 42. The bleed-air inlet port 20 of the air-control valve 18 is connected to the bleed-air outlet 38 of the engine 40 between the latter and its associated valve 42 so as to permit port 20 to conduct during starting operation the exhaust from the air motor to the engine 40 which in those circumstances does not produce an appreciable bleed-air pressure. The consumer line 37 is connected, through a non-return valve 43, to a point of the starting-pressure supply line 34 which leads, when the valve 30 is in the starting position, from the starting-pressure supply source 34 to motor connection 22.

When the engine 40 is operating in its normal speed range, bleed air pressure is available in line 20, and valve 30 is in the position in which motor connection 22 is open to exhaust connection 23. Bled air is also available in the consumer line 37, either from both engines 40 and 41, or, if engine 41 is not running, from engine 40 only, engine 41 being sealed off by its non-return valve 42. When engine 40 is stationary and is required to be started, valve 30 connects motor connection 22 to starting-pressure line 34, which is pressurised from a starting power source 44 and sealed from consumer duct 27 by non-return valve 43, while the exhaust from the motor is led by port 20 to the bleed-air connection 38 of engine 40 which in these circumstances is not under pressure, thus ensuring the required pressure difference between motor inlet and motor outlet. If finally an engine 40 fails at a time when electric supply is required from the alternator 3, while engine 41 continues to run, a condition which may for example arise in a plural engined aircraft upon failure of engine 40, the drive shaft 1 (FIGURE 1) is disconnected from engine 40 and the differential gear 4 is locked by the locking means 35, 36, while the valve 30 is arranged to be in the position in which the duct 34 communicates with connection 22. The alternator is then driven by the air motor, in its normal direction and at a speed which is arranged to be substantially equal to its normal running speed, the air motor being fed by bleed air from engine 41 which is admitted to motor connection 22 via the non-return valve 43.

It will be appreciated that while an arrangement has been described in which the differential gear has two externally toothed sun gears of which the smaller one is coupled to the engine shaft and the larger one to the alternator, the air motor being coupled to the planet carrier, the connections of the air motor, engine, and alternator may be interchanged involving in some cases the reversal of the direction of rotation of one or other of these units, in a manner well known to those versed in the art of differential gears, and other types of differential gears, more particularly those including an internally toothed wheel, may also be employed if desired. Also in various other respects the invention is not limited to all the details of the embodiment which has been described with reference to FIGURES 1 to 5. Thus the Roots-type rotary-displacement motor may be replaced by any motor the speed of which can be adjusted within the requisite range, and in which the direction of the torque can be reversed so as to drive the motor in the opposite direction for starting purposes. For example the Roots-type motor described may be replaced by another positive-displacement machine capable of being driven in two opposite directions with a speed which is variable continuously or nearly so, at least in one direction, from zero to a maximum speed. Such machine may be of a fixed or variable displacement type, and suitable machines include vane-type machines of a self-starting kind having either fixed or adjustable displacement, piston-type machines, which may be of the crank type or of the swash-plate type, gear-type machines, and helical-displacement machines with or without expansive working. The reversal of direction of torque may, where practicable, be effected by reversal of the direction of flow, as in the embodiment described above, any variable-stroke or variable-displacement feature being preferably used for subsidiary purposes such for example as adaptation to varying fluid-supply pressure, whereby the efficiency of the drive may be improved. It will also be appreciated that while one type of gearing has been illustrated in FIGURES 1 to 5, the construction of the gearing may be varied within the scope of the invention. Thus for example the smaller one of two externally toothed sun wheels may be arranged on the engine-drum shaft 1 and the larger one on the shaft coupled to the alternator, in which case the air motor must be arranged to run during "ground running"

in the "forward" direction, i.e. the same direction in which it runs for supplementing the engine-derived speed of the alternator. Furthermore friction brakes may be used instead of the arrangements described for locking the gear, or so called sprag brakes may be used in cases where only unidirectional locking is required, and bevel or epicyclic type differential gears may be employed according to preference or requirements. The over-speed-safety valve operation of valve 30, instead of being achieved by means of an auxiliary vent to the valve actuator chamber 32, may be effected by a mechanical trip device interposed between the actuator and the valve, or a separate safety valve, additional to the valve 30 used for starting purposes, may be arranged in pump connection 22. Also, more particularly in the case where a separate safety overspeed valve is employed, the change-over valve connections of line 22 for starting purposes may be effected by further lands on the governor slide-valve spool 18 beyond the land 27, which are arranged to effect the change-over by further movement of the spool 18 beyond the normal low-speed position when the alternator speed is substantially below its normal minimum.

Some modifications are illustrated in FIGURES 7 to 11.

In FIGURE 7 the Roots-type motor 13 has been replaced by a vane-type machine. The machine comprises a rotor 44 having sliding vanes 45 which are held, by any conventional or convenient means, in engagement with the internal periphery of a stator 46 having two outlets to which the conduits 15 and 22 are respectively connected. In the illustrated embodiment the eccentricity of the housing 46 relative to the rotor body 44 is adjustable along slideways 47, and a cylinder 48 connected by a line 49 to the fluid-pressure supply is provided by means of which increase in supply pressure tends to reduce the eccentricity of the stator 46, being opposed in this action by a spring 50. When the available fluid pressure is low, the eccentricity of the rotor 44 to the stator 46 is large so as to make adequate power available, while when the supply pressure is higher, this eccentricity is reduced, in view of the fact that the requisite power can then be produced by a smaller flow.

FIGURE 8 shows the replacement of the Roots-type motor 13 by a two-cylinder double-acting piston machine 51 equipped with a suitable control valve mechanism 52 coupled by means 53 to the crank shaft 54; as in the cases described above, the motor shaft 54 is connected to the gearing 4.

FIGURE 9 diagrammatically illustrates a swash-plate type machine. An annular array of cylinders 55 is mounted for rotation with a shaft 56 coupled to the gearing 4, and the piston 57 of the various cylinders are connected by link rods 58 to correspondingly arranged points of an actuating plate 59 which rests through ball bearings 60 on an inclined base 61; each piston performs one reciprocation for each revolution of the cylinder array. The inclination of the base 61 is adjustable about a fulcrum 62 and is controlled, as in the case of FIGURE 7, by a cylinder 48 connected by a line 49 to the fluid-pressure supply.

FIGURE 10 shows a gear-type motor 63 which again, as in the machines of the previous examples, is connected to the fluid circuit by conduits 15 and 22, and finally FIGURE 11 shows the replacement of the Roots-type machine by a helical-displacement machine 64.

What we claim is:

1. A constant-speed drive comprising an input shaft for connection to an engine operative in a forward direction subject to speed variations, an output shaft to be driven at a constant speed in a predetermined direction, a three-element differential gear set having two elements respectively operatively connected to the input shaft and output shaft, an auxiliary motor to which the third element of the differential gear set is operatively connected, said motor having at least one power-supply connection, control means associated with said power-supply connection, said control means being operatively connected to the output shaft and responsive to the speed of said output shaft to control the power supply to the motor so as to vary the speed of the motor according to the speed of the input shaft and cause the motor to be power-driven in one normal direction to supplement the speed of the output shaft when the speed of the input shaft is below a predetermined value, and to be driven in the reverse direction by reaction from the differential gear set to reduce the speed of the output shaft when the speed of the input shaft is above the predetermined value, automatic unidirectional locking means operatively connected to the output shaft to prevent the output shaft from rotating in the direction opposite to the said predetermined direction, and means for power-driving the auxiliary motor in the said reverse direction to drive the input shaft for starting such engine.

2. A constant-speed drive as claimed in claim 1, wherein the auxiliary motor is a motor operated by fluid under pressure.

3. A constant-speed drive as claimed in claim 1, wherein the auxiliary motor is a fluid pressure motor of the positive displacement type.

4. A constant-speed drive as claimed in claim 1, wherein the auxiliary motor is a fluid pressure motor of the rotary displacement type.

5. A constant-speed drive as claimed in claim 1, wherein the auxiliary motor is a fluid pressure motor of the rotary fixed-displacement type.

6. A constant-speed drive as claimed in claim 1, wherein the auxiliary motor is a Roots-type fluid pressure motor.

7. A constant-speed drive comprising an input shaft for connection to an engine operative in a forward direction subject to speed variations, a rotary positive-displacement machine, an output shaft to be driven at a constant-speed in a predetermined direction, a differential-gear set operatively coupling said machine and input shaft to each other and to said output shaft, fluid-pressure supply means, fluid-supply control means associated with said supply means and motor, means responsive to the speed of the output shaft and operatively connected to the fluid-supply control means to supply said machine with a flow in one direction of fluid from said supply means to power-drive the machine in a first direction of rotation and at such speed as to keep the speed of the output shaft essentially constant when the input-shaft speed is below a predetermined first value and above a predetermined second value, starting-control means associated with said supply means and motor and operable to supply said machine with a flow in the direction opposite to said one direction of fluid from said supply means to power-drive the machine in a second direction opposite to said first direction of rotation, and automatic locking means so associated with the output shaft as to prevent the output shaft from being driven in the direction opposite to said predetermined direction so as to cause the input shaft to be driven in the forward direction when the rotary-displacement machine is thus driven in the second direction.

8. A constant speed drive as claimed in claim 7 in combination with a gas turbine engine operatively connected to the input shaft, said engine including a compressor having a bleed, the drive including an alternator connected to the output shaft and means for supplying the positive displacement machine with bleed air from the engine compressor bleed under the control of the fluid control means when said engine is running under its own power.

9. A constant-speed drive comprising an output shaft to be driven at a predetermined constant-speed, an input shaft for connection to an engine operative in a forward direction subject to speed variations, a positive-displacement fluid-pressure motor having two fluid passages respectively connected to opposite sides thereof to act respectively as inlet and outlet passages, a differential gear set operatively interconnecting said motor and input and output shafts, a fluid-pressure supply means, automatic control means co-operating with said fluid passages and with said fluid-pressure supply means, said automatic control means being operative, when the speed of the input shaft is below a predetermined value, to cause the fluid-pressure motor to be driven in a first direction and at such speed by fluid pressure from the supply means as to supplement to the predetermined constant speed the speed of the output shaft derived from the input shaft, and being operative when the speed of the input shaft is above said predetermined value, to allow the fluid-pressure motor to act as a pump driven in the direction opposite to the first direction by reaction from the gear set and to so regulate the flow of fluid passing through said motor acting as a pump that the resultant movement of the motor reduces the speed of the output shaft below the speed derived from the input shaft to the said predetermined constant speed, and engine-starting control means associated with said fluid passages and fluid-pressure supply means and with the differential gear set and operable to cause the motor when supplied with fluid pressure from the fluid-pressure supply means to drive the input shaft for starting such engine in said forward direction.

10. A constant speed drive as claimed in claim 9, wherein the automatic control means includes a slide valve and a governor responsive to the speed of the output shaft to control the position of said slide valve.

11. A constant-speed drive as claimed in claim 9, wherein the fluid-pressure motor is of the variable-displacement type, the combination including pressure-responsive means associated with said fluid-pressure supply passage and operative to automatically adjust the displacement of said motor according to the pressure in said passage when the motor is power driven by fluid pressure.

12. A constant-speed drive as claimed in claim 9, further including an ejector device associated with the fluid passage which acts as the outlet passage when the motor operates as a pump, the automatic control means including means rendering said ejector device operative to reduce the pressure in the said fluid passage when the speed of the input shaft exceeds a predetermined further speed which is higher than the said predetermined speed.

13. A constant-speed drive as claimed in claim 9, which includes automatic unidirectional locking means operatively connected to the output shaft to prevent the output shaft from rotating in the direction opposite to the said predetermined direction, said engine-starting control means being operable to cause the motor, when supplied with fluid pressure from the fluid-pressure supply passage, to be driven oppositely to said predetermined direction.

14. A constant-speed drive as claimed in claim 13, wherein the fluid-pressure motor is of the kind in which the direction of its drive is reversible by reversing the fluid flow between the two fluid passages, the combination including an atmospheric port in each of the two fluid passages connected to the motor and having in one of said passages, which is the outlet passages when the motor is driven to supplement the speed of the output shaft, an atmospheric port and a pressure port communicating with the fluid-pressure supply means, the combination also including a starting-control valve having a normal position and a starting position, said starting control valve, when in its normal position, closing said pressure port and opening said atmospheric port in the said fluid passage and when in its starting position, closing the atmospheric port and opening the pressure port in the said fluid passage.

15. The combination of a constant-speed drive as claimed in claim 14 with a gas-turbine engine operatively connected to said input shaft and with an engine compressor driven by said turbine engine for the supply of combustion air to said engine, said compressor having an air bleed, wherein said constant-speed drive includes a pressure-sensitive element having a pressure inlet connected to said air bleed, said pressure sensitive element being operatively connected to the starting-control valve and being responsive to the pressure at said air bleed to automatically change the position of said valve from the starting position to the normal position when the pressure at said air bleed exceeds a predetermined value.

16. The combination as claimed in claim 15, wherein the other fluid passage has a feed port communicating with said air bleed and an atmospheric port, said automatic control means being operative when the speed of the input shaft is below the predetermined value, to open the feed port and close the atmospheric port of said other fluid passage, and when the speed of the input shaft is above said predetermined value, to close the feed port and open the atmospheric port in said other fluid passage.

17. The combination of a constant-speed drive as claimed in claim 13 with a variable-speed engine which, at a predetermined starter-decoupling speed, is at least self-sustaining under no-load conditions, and which is capable of steady running within a speed range extending from an idling speed to a predetermined maximum speed, and with means at least selectively operatively coupling said engine to the input shaft, wherein the transmission ratio from the motor to the engine is sufficiently great to drive, with the output shaft stationary, the engine at least at the decoupling speed when the motor is running at its maximum speed in a direction opposite to said predetermined direction, the transmission ratio from the motor to the output shaft being such as to drive the output shaft at its normal speed when the engine runs at its idling speed and the motor runs at nearly its maximum speed in said predetermined direction and also to drive the output shaft at its normal speed when the engine runs at its maximum speed and the motor working as a pump runs at nearly its maximum speed in the direction opposite to said predetermined direction.

18. A constant-speed drive as claimed in claim 9, further including a cut-off valve in one of the fluid-passages of the motor, and overspeed-sensitive means responsive to the speed of the output shaft and operatively connected to said cut-off valve to cut off fluid flow through the fluid-pressure motor when the speed of the output shaft exceeds a predetermined safety limit higher than the predetermined normal speed of the output shaft.

19. A constant-speed drive according to claim 9 for connection to an engine subject to speed variations between an idling speed and a maximum speed, further including a cut-off valve in one of the fluid passages of the motor, and means responsive to the speed of the fluid-pressure motor and operatively connected to said cut-off valve to cut off the flow through the motor when the speed of the fluid-pressure motor exceeds a predetermined maximum speed sufficient to produce the predetermined output shaft speed with the engine at idling speed.

20. Apparatus as claimed in claim 1, further comprising means operable to lock the differential gear and thus cause the auxiliary motor to drive both the engine shaft and the third element in their forward and normal directions respectively.

21. An engine accessory drive mechanism comprising: first and second members adapted to be operatively connected to an engine and an accessory thereof respectively; a reversible variable speed motor; differential gear means operatively connected between said motor and said first and second members; and means responsive to variations in the speed of operation of one of said members for controlling the magnitude of the torque of said motor within a motor-speed range extending to both sides of and the direction of said torque at one side of zero speed so as to maintain the speed of operation of one of said members substantially constant.

22. An engine accessory drive mechanism comprising: first and second members adapted to be operatively connected to an engine and an accessory thereof respectively; a displacement-type reversible variable speed fluid-pressure motor; differential gear means operatively connected between said motor and said first and second members; and fluid-flow control means associated with said motor and responsive to variations in the speed of operation of one of said members for controlling the magnitude of the torque of said motor within a motor-speed range extending to both sides of, and the direction of said torque at one side of zero speed so as to maintain the speed of operation of one of said members substantially constant.

23. An engine accessory drive mechanism as claimed in claim 22, wherein the reversible motor includes displacement means, and which includes an atmospheric motor-connection duct and a second motor connection duct separated from said atmospheric connection duct by said displacement means, a further atmospheric duct, an ejector in said further atmospheric duct for producing sub-atmospheric pressure in the said duct, and a fluid-pressure supply connection, said fluid-flow control means having connections to said second motor connection to said fluid-pressure supply connection, to said further atmospheric duct, and to said ejector nozzle and being operative, according to such speed variations, to selectively connect said motor connection to said fluid-pressure connection or to said further atmospheric duct, or finally to connect said second motor connection to the atmospheric duct and said fluid-pressure connection to said ejector nozzle.

References Cited by the Examiner

UNITED STATES PATENTS

| | | | |
|---|---|---|---|
| 1,313,842 | 8/1919 | Tridice | 253—51 |
| 2,047,050 | 7/1936 | Armington | 74—675 |
| 2,402,547 | 6/1946 | Gilfillan | 74—675 |
| 2,820,341 | 1/1958 | Amann | 253—59 |
| 2,908,189 | 10/1959 | Parker et al. | 74—810 |
| 2,959,918 | 11/1960 | West | 123—179 |

FOREIGN PATENTS

| | | |
|---|---|---|
| 740,077 | 11/1932 | France. |
| 759,606 | 10/1956 | Great Britain. |

DAVID J. WILLIAMOWSKY, *Primary Examiner.*

BROUGHTON G. DURHAM, DON A. WAITE,
*Examiners.*

F. G. McKENNA, T. C. PERRY, *Assistant Examiners.*